United States Patent [19]

Howard

[11] Patent Number: 5,636,896

[45] Date of Patent: *Jun. 10, 1997

[54] PNEUMATIC BICYCLE SADDLE

[76] Inventor: Charles R. Howard, 26 Dale Dr., Keene, N.H. 03431

[*] Notice: The term of this patent shall not extend beyond the expiration date of Pat. No. 5,524,961.

[21] Appl. No.: 663,587

[22] Filed: Jun. 10, 1996

Related U.S. Application Data

[63] Continuation-in-part of Ser. No. 441,458, May 15, 1995, Pat. No. 5,524,961.

[51] Int. Cl.$^6$ .................................................. B62J 1/26
[52] U.S. Cl. ........................... 297/199; 297/215.16
[58] Field of Search ..................... 297/452.22, 195.1, 297/199, 200, 215.16, DIG. 2, DIG. 3, 215.14, 214.13, 452.41

[56] References Cited

U.S. PATENT DOCUMENTS

| 569,796 | 10/1896 | Myers | 297/199 |
|---|---|---|---|
| 3,146,024 | 8/1964 | Timms | 297/215.16 |
| 4,429,915 | 2/1984 | Flager | 297/199 |
| 5,318,344 | 6/1994 | Wang | 297/199 |
| 5,330,249 | 7/1994 | Weber et al. | 297/199 |
| 5,340,192 | 8/1994 | Hsh | 297/197 |
| 5,348,369 | 9/1994 | Yu | 297/214 |

FOREIGN PATENT DOCUMENTS

| 36330 | 5/1930 | France | 297/199 |
|---|---|---|---|
| 962140 | 6/1950 | France | 297/199 |
| 375518 | 6/1920 | Germany | 297/199 |
| 583905 | 12/1932 | Germany | 297/199 |
| 6009 | 3/1894 | United Kingdom | 297/199 |
| 14628 | 7/1895 | United Kingdom | 297/199 |
| 15276 | 2/1897 | United Kingdom | 297/195.1 |
| 298998 | 10/1928 | United Kingdom | 297/199 |

*Primary Examiner*—Milton Nelson, Jr.
*Attorney, Agent, or Firm*—William B. Ritchie

[57] ABSTRACT

A bicycle saddle having an air-filled bladder. The bladder is a durable plastic film chamber having an easily accessible air pump and release valve that allows the bicyclist to adjust the air pressure to his/her comfort without dismounting and or seeking an air supply. The bladder is fitted to conform to a plastic shell base. The bicyclist's weight is supported by the bladder that maintains its shape due to material selection and thickness plus a supporting base. Additional dimensional stability is provided by spot welds of the bladder material to control expansion. Also, an optional skirt is provided on the base and the bladder to further hold it in position when inflated. A simple push pump at the rear and a release valve button under the nose of the saddle enables the saddle to be adjusted for pressure. Metal rails provide generous fore and aft adjustment and a place to firmly clamp the saddle to the bicycle seat post. The saddle is covered with a soft flexible material and adhered to the plastic base. The few number of parts and the absence of mechanical gadgetry, allow the saddle to be manufactured, assembled, and offered at low cost.

9 Claims, 3 Drawing Sheets

PNEUMATIC BICYCLE SADDLE

This application is a continuation-in-part of U.S. patent application Ser. No. 08/441,458, filed May 15, 1995, now U.S. Pat. No. 5,524,961.

BACKGROUND OF THE INVENTION

1. Field of the Invention

The invention relates to seats for bicycles, particularly, seats that can be pneumatically adjusted for comfort and fit.

2. Description of the Related Art

Despite the renewed popularity of bicycling over the last twenty years that has resulted in a plethora of improvements, a comfortable bicycle saddle is still absent. Some attempts have focused on saddle spring arrangements or the use of more resilient materials. Pneumatic seats have appeared to offered the most promising improvement. However, current designs have been found to be deficient.

U.S. Pat. No. 4,611,851, issued to Noyes et al. on Sep. 16, 1986, discloses a pneumatic saddle that is rotocasted or reaction injected molded to provide a hollow saddle. The hollow saddle via a valve is said to be capable of being inflated to preferably 20 to 40 psi. The saddle cannot be adjusted while riding and must be connected to an external source of high pressure air to inflate the seat.

U.S. Pat. No. 5,244,251, issued to Bouria on Sep. 14, 1993, discloses another pneumatic saddle. In this device, the hollow cavity within the saddle is provided with a plurality of partitions that communicate with one another. The seat is fitted with a conventional air valve that is used with automobiles and bicycles tires. Again, this seat cannot be adjusted while riding and must be connected to an external source of high pressure air to inflate the seat.

U.S. Pat. No. 5,330,249, issued to Weber et al. on Jul. 19, 1994, discloses still another variation of a pneumatic bicycle seat. In this device, a deformable polyurethane bladder is used to contain the "firmness" adjusting fluid, preferably a gel of PVC resin and a dialkyl phthalate plasticizer along with air. As above, this device cannot be easily adjusted, nor can be adjusted when the bicyclist encounters different cushioning needs while riding.

Another variation of the bladder theme is taught in U.S. Pat. No. 5,280,993, issued to Hsh on Jan. 25, 1994. In this device, a complicated fluid supply reservoir is connected to a fluid containing bladder. A check valve is required to be connected between the two. A second valve is required to release pressure. The location of a fluid reservoir is positioned under the seat where it is nearly impossible to reach when a bicyclist is seated. Thus, the device cannot be adjusted while the user is riding the bicycle.

A pneumatic bicycle saddle that ergonomically conforms to the anatomical shape of either male or female bicyclists, can be easily adjusted while riding, and is uncomplicated to manufacture is not found in the prior art.

SUMMARY OF THE INVENTION

It is an aspect of the invention to provide a pneumatic bicycle saddle that relieves the discomfort in the ischial tuberosity bone areas in the buttocks and the perineum.

It is another aspect of the invention to provide a pneumatic bicycle saddle that enables the bicyclist to ride on a cushion of air.

It is still another aspect of the invention to provide a pneumatic bicycle saddle that has a durable inflatable bladder that will retain its shape under pressure.

Another aspect of the invention is to provide a pneumatic bicycle saddle that features an inflatable bladder that retains its shape by having spot welding points strategically located to control expansion.

It is another aspect of the invention to provide a pneumatic bicycle saddle that has a simple and conveniently located means for adjusting the seat to accommodate the rider's comfort.

It is another aspect of the invention to provide a pneumatic bicycle saddle that has a pneumatic comfort adjustment device that can be regulated without need for dismounting the bicycle and without need for an external source of compressed air.

It is still another aspect of the invention to provide a pneumatic bicycle saddle that has attachment rails having a substantial parallel alignment length, thereby enabling the saddle to be attached over a wide range of forward and backward positions thus accommodating a large number of different leg lengths and sitting styles.

Finally, it is an aspect of the invention to provide a pneumatic bicycle saddle having a minimum quantity of parts to allow for a lightweight ergonomic design that conforms to the human anatomy, is simple to manufacture, and quick to assemble and is producible at an affordable cost.

The invention is a saddle for a bicycle. A molded base shaped to conform to a human perineum region is provided. The base has a front tapered end, a rear widened end, with top and bottom surfaces. The base has a pump opening through the rear widened end, said pump opening communicating with said cavity. The base also has a valve opening through the bottom surface of said base, adjacent to the front tapered end. The base also has a pair of front rail receiving openings positioned in the bottom surface of said base, adjacent to the front end, with a pair of rear rail receiving openings also positioned in the bottom surface of said base, adjacent to the widened rear end. A pair of rails is provided. Each rail has a forward section and a rearward section with said rearward section of each rail being substantially parallel to one another. Each of said rearward sections has a length that permits said saddle to be adjusted forwardly and rearwardly on said bicycle. The rails are attached to the saddle with the rearward sections being attached in said rear rail receiving openings and said forward sections being attached in said front rail receiving openings. An inflatable bladder is provided and is attached to the base. The bladder is dimensioned to fit the top surface contour of the base. A pump is provided and is attached to said bladder through said pump opening in said base. When the pump is compressed, air is pumped into said inflatable bladder. A release valve is provided and is attached to said bladder through release opening in said base. When the release valve is opened, air is released from said bladder. A cover shaped substantially similar to said base is provided. The cover encloses the top surface of said base.

DETAILED DESCRIPTION OF THE INVENTION

Figure 1:
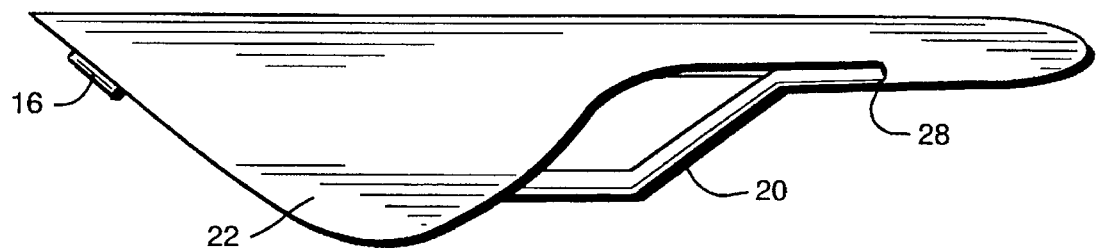
FIG. 1 is a side view of the pneumatic bicycle saddle in accordance with the invention.

FIG. 1 is a side view of pneumatic bicycle saddle 10. The exterior of saddle 10 which is in contact with the seated bicyclist is soft, flexible cover 22. Cover 22 can be made of leather, lycra, or other durable material. The cover 22 can be attached to saddle 10 by means of an adhesive, hook and loop type of fasteners, or staples to the underside of base 2 (shown in FIG. 12) along its outer perimeter. Rails 20 enable saddle 10 to be fastened to a bicycle via the bicycle's post attachment member (not shown) using mounting techniques well known in the art.

Figure 2:
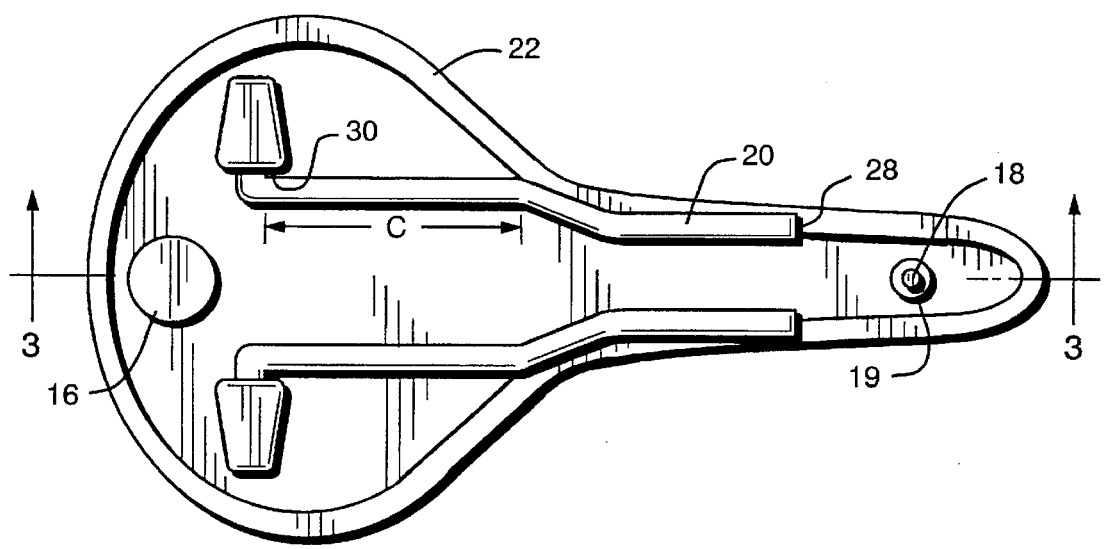
FIG. 2 is a bottom view of the saddle.

FIG. 2 is a bottom view of saddle 10. Rails 20 are substantially parallel to one another in region C. In this manner, saddle 10 can be fastened to the bicycle anywhere along region C, thus permitting easy adjustability both forward or backward to accommodate various leg lengths or seating preferences. Cover 22 is attached to base 12 as noted above.

Figure 3:
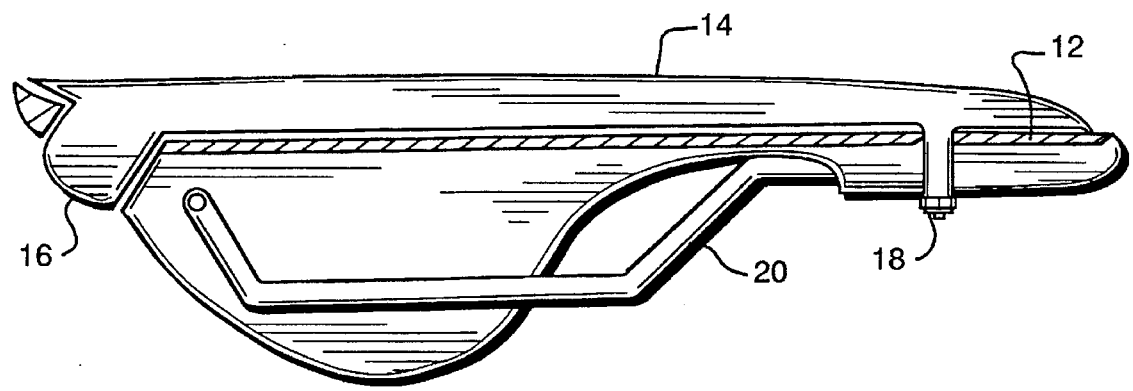
FIG. 3 is a cross-sectional view of the saddle along section lines 3—3 as shown in FIG. 2.

FIG. 3 is a cross-section view of saddle 10 along section lines 3—3 as shown in FIG. 2. Cover 22 has been removed for clarity. Base 12, preferably plastic, provides the framework of the invention. Base 12 is preferably constructed of thermoplastic material well known in the art such as polypropylene, polyetheylene, polyurethane, nylon, or a polycarbonate or a combination of the above. The selected plastic(s) is heated and injected into a mold resulting in the shape as shown by techniques well known in the art.

Base 12 is preferably 10 to 12 inches in length, front to rear, 6 to 7 inches wide at its widest dimension for a men's version, and 7 to 8 inches wide for women due to a wider gap between the ischial tuberosity bones. The ischial tuberosity bones and the surrounding muscle and tissue provide the major support of the bicyclist when he/she is seated upon a bicycle seat.

Figure 4:
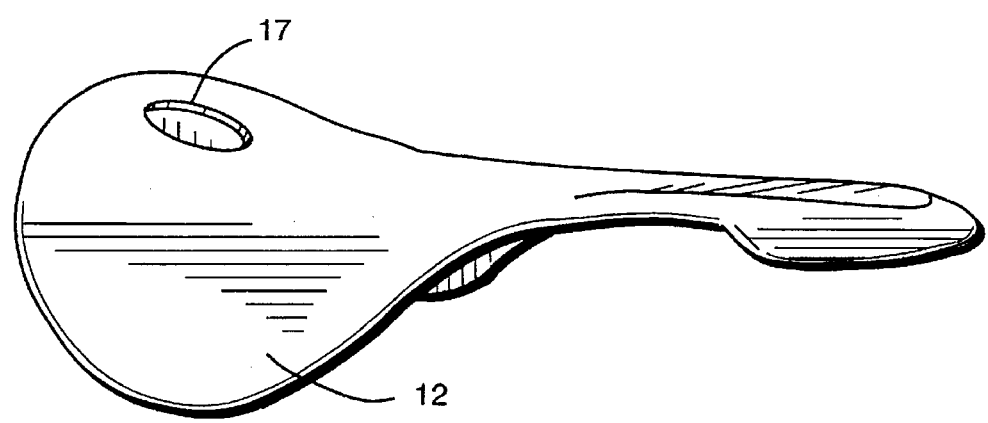
FIG. 4 is a side isometric view of the seat base.

As shown in FIG. 4, base 12 has a crowned side to side contour most like the human perineum region and then tapers toward the nose of saddle 10. The top surface of base 12 gradually tapers up in height at the rear section starting approximately 2.5 inches toward the nose from the rear and slopes up to the rear crown forming a rear wall that accommodates pump opening 17. Holes 28 and 30 (shown in FIG. 2) are machine bored approximately ¼ inches in diameter and ¾ to 1 inches deep and are dimensioned to tightly fit rails 20. An adhesive may be added to holes 28 and 30 to aid in security. Holes 28 are located underneath base 12 to either side of air pump hole 17 (shown in FIG. 4) in the rear section. Pump 16 is fitted through hole 17 and is connected to bladder 14. Holes 30 are preferably about 2 inches apart measured from opening to opening.

Rails 20 are the anchoring devices for firmly attaching the invention to a seat post extending from the bicycle frame. Rails 20 also allow for forward and backward adjustment of the invention to compensate for leg length and sitting style. Rails 20 are preferably ¼ inch solid metal and can be made of several available metals. The preferred material is cromoly steel for strength and reasonable cost. Other metals may include vanadium, carbon fiber, titanium, and manganese. These metals are attractive in weight and strength but are costly. Rails 20 beginning at the rear of base 12, exit holes 30 and bend 90 degrees towards the nose of base 12 running parallel for approximately 4 inches. This enables saddle 10 to have a wide ranging fore and aft adjustment capability. Rails 20 then bend 10 degrees toward the center of base 12 and 40 degrees toward the top of base 12. This section is approximately 1¾ inches long. The final section of rails 20 is about 1¼ inches long and finally is inserted into holes 28.

FIG. 2 shows the positioning of air pump 16 and release valve 18. By positioning pump 16 at the rear of the seat and release valve toward the front of the seat, the pressure inside bladder 14 can be easily adjusted even while riding.

Figure 5:
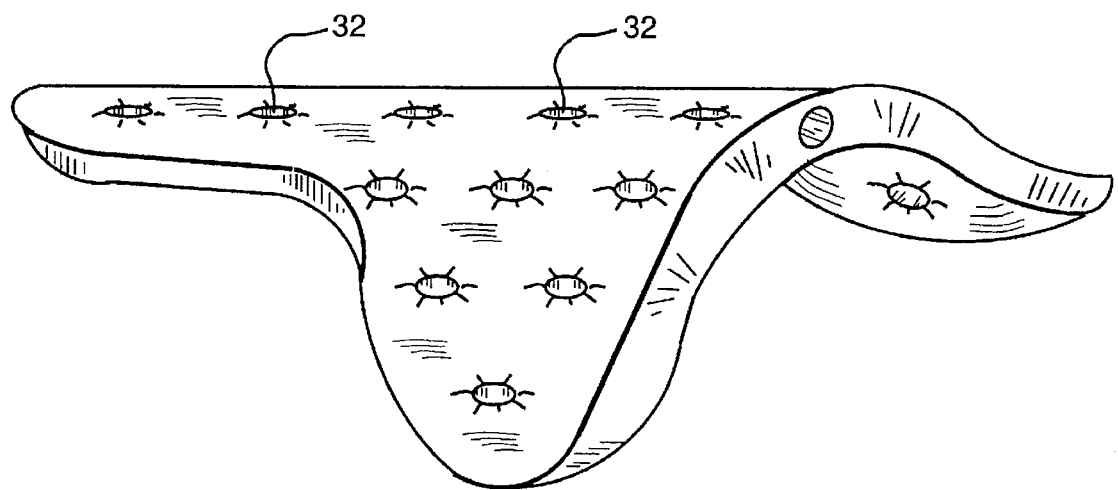
FIG. 5 is a side isometric view of the air bladder assembly.

FIG. 5 is a side isometric view of air bladder 14. The main problem that arises with pressurized air in a flexible bladder is a ballooning tendency and loss of shape which can translate to a loss of support. A key aspective of this invention is to control this air under pressure and manipulate it to the rider's advantage. Past attempts of pneumatic bicycle saddles have dealt with this problem using complicated seams, chambers, air passages, compartments, combinations of cushions and bladders and taut sealing covers. While this approach can achieve control of the shape of the flexible bladder, the complexity of such designs makes them costly to manufacture and could result in an unappealing product, visually and economically.

Air bladder 14 is constructed of a urethane film 8 to 20 mils thick, with the preferable thickness about 10 to 15 mils. Urethane has a durable quality, superior air retention, good resistance to heat and cold, and unlimited shapeability. Other material such as polyvinylchloride(pvc) may also be used, but urethane has proven to be the material of quality and choice. Lesser mil thicknesses translates to a squishy feel and lesser tolerance of air pressure and can promote ballooning. Higher mil thicknesses will increase strength, allow higher air pressure, but may prove to be too dense and hard feeling. A balance of mil thickness, air pressure and construction technique is required to achieve the proper bladder stability.

Bladder 14 controls its shape by a cooperation of bladder material dielectric spot welding techniques, material mil thickness. A number of dimples 32 placed over the surface of bladder 14, a couple of inches apart, can be created by dielectrically spot welding the upper and lower surfaces of bladder 14 together. Dimples 32 prevent the upper and lower surfaces from expanding apart with minimal loss of interior air space. Dimples 32 do not prevent air flow throughout bladder 14. They do, however, aid in detouring air and greatly diminishing expansion. As a rider sits on saddle 10, the weight of the rider causes an increase in pressure in the seat. The body contact points push air away, usually out and up. The spot welds and seams prevent the expansion up. A thicker mil material may need less spot welding if any at all because it offers more strength and less flex. A thinner mil thickness may need more welds because it can expand more and requires more control. The key to bladder density is: not too soft and not too hard. As noted above, the inventor has found that a urethane bladder between 10 to 15 mils thick is preferred.

Urethane bladder 14 is preferably of the type that can be manufactured by Dielectric Industries of Chicopee, Mass. Bladder 14 is preferably inflated to ½ to ¾ inch thick from the top surface to the bottom surface to fit snugly on top of base 12. There, bladder 14 can be attached to base 12 with either an adhesive epoxy compatible with both urethane and the base 12 plastic so degradation does not occur or with the use of an adhering strip material such as provided by VELCRO Manufacturing. Another embodiment of this adhesion step is the use of an extension tab of urethane off of the top surface perimeter of bladder 14 that extends ⅜ inch or more onto surface of base 12 and then the extension tab is epoxied to base 12. This latter method could allow for unadhered contact of bladder 14 to base 12 and permit easy removal if necessary. A combination of above adhering methods may also be used.

Bladder 14 is inflated/deflated by air pump 16 and release valve 18. Pump 16 and valve 18 are preferably the type that it is used by Reebok, Inc. in their inflatable sport shoes. This type of pump and release valve combination has proven to be extremely durable, reliable and is also compact. Therefore, pump 16 and release valve 18 can be positioned on saddle 10 such that a rider is able to adjust saddle 10 to his/her comfort while riding. Pump 16 is centrally located on the rear widened end of base 12 passing through hole 17 in cavity wall 26 and sealed into bladder 14. Valve 18, sealed on the bottom side of bladder 14, passes through opening 19 in the top surface of base 12 located in the center of tapered front end and protrudes through base 12 where it is easily accessible with the reach of a finger. All sealing in bladder 14 is conducted by dielectric sealing such as provided by Dielectric Ind. of Chicopee, Mass.

Figure 6:
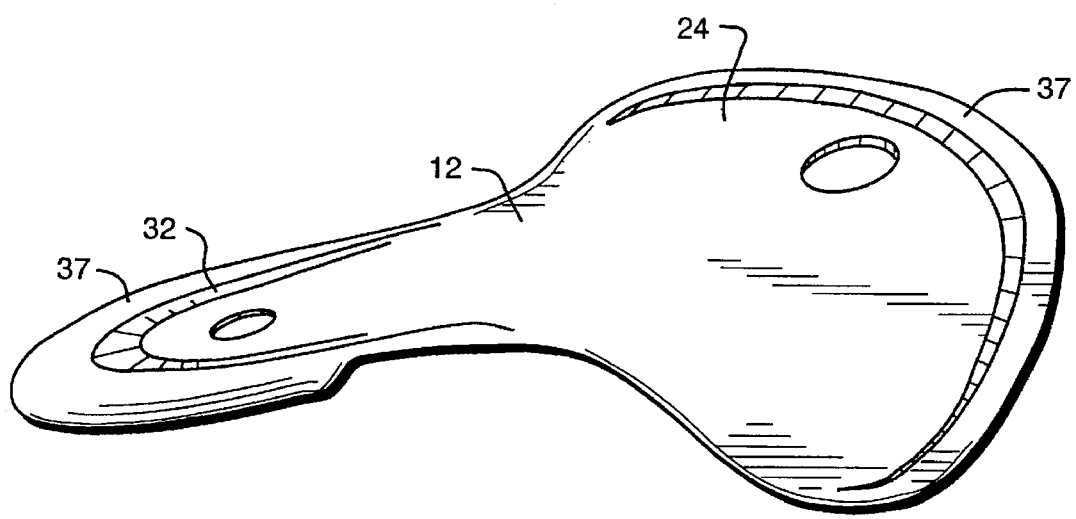
FIG. 6 is a side isometric view of an alternative embodiment of the base.

Referring now to FIG. 6, an alternative embodiment of base 12 is shown. In this embodiment, skirt 37 is added to the periphery of base 12—both fore and aft. Skirt 37 enables bladder 14 to be more securely attached to base 12, thus further preventing the ballooning or misalignment of bladder 14 when pump 16 inflates air into bladder 14. Skirt 37 provides cavity 24 which enables, via wall 72, to hold bladder 14 in place. Bladder 14 is shaped accordingly and may be adjusted to provide a skirt that matches skirt 37 by which bladder 14 is adhered to base 12.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A saddle for a bicycle comprising:

a molded base shaped to conform to a human perineum region, said base having a front tapered end, a rear widened end, top and bottom surfaces; said base having a pump opening through the rear widened end, said pump opening communicating with the top surface of said base, and having a valve opening through the bottom surface of said base, adjacent to the front tapered end; said base also having a front rail receiving opening positioned in the bottom surface of said base, adjacent to the front tapered end, and a pair of rear rail receiving openings also positioned in the bottom surface of said base, adjacent to the rear widened end;

a pair of rails, each rail having a forward section and a rearward section with said rearward section of each rail being substantially parallel to one another, and each of said rearward sections having a length that permits said saddle to be adjusted forwardly and rearwardly on said bicycle, said rearward sections being attached in said rear rail receiving openings and one of said forward sections being attached in said front rail receiving opening;

an inflatable bladder, attached to said base, and having a top, bottom surface and shaped substantially like the shape of said base; said bladder having a plurality of interconnections between said top surface and said bottom surface of said bladder such that said interconnections cause said bladder to retain its shape when said pump inflates said bladder;

a compressible air pump, attached to said bladder through said pump opening in said base, such that when said pump is compressed, air is pumped into said inflatable bladder;

a release valve, attached to said bladder through a release opening in said base, such that when said release valve is opened, air is released from said bladder.

2. The saddle of claim 1 further comprising:

a cover shaped substantially similar to said base such that said cover encloses the top surface of said base.

3. The saddle of claim 2 wherein said cover is leather.

4. The saddle of claim 2 wherein said cover is plastic.

5. The saddle of claim 1 wherein said bladder is plastic and said interconnections between said top and bottom surfaces of said bladder are spot welds of the plastic material.

6. The saddle of claim 1 wherein said base further comprises a skirt, fore and aft, and wherein said bladder further comprises a skirt that is attached to said base, wherein said skirt firmly attaches said bladder to said base.

7. The saddle of claim 6 wherein said skirt of said bladder is attached to said base using an adhesive.

8. The saddle of claim 1 wherein said bladder is fabricated from urethane material having a thickness ranging from approximately 10 to 15 mils.

9. The saddle of claim 1 wherein said base is molded from at least one thermoplastic selected from the group consisting of polypropylene, polyetheylene, polyurethane, nylon, and polycarbonate.

* * * * *